United States Patent [19]
Chan et al.

[11] Patent Number: 5,970,144
[45] Date of Patent: Oct. 19, 1999

[54] SECURE AUTHENTICATION-KEY MANAGEMENT SYSTEM AND METHOD FOR MOBILE COMMUNICATIONS

[75] Inventors: Yick Man Chan, Palo Alto; Michael D. Gallagher, San Jose; Vilnis G. Grencions; Randall A. Snyder, both of Santa Clara; Ming J. Lee, Los Altos, all of Calif.

[73] Assignee: Synacom Technology, Inc., San Jose, Calif.

[21] Appl. No.: 08/791,992

[22] Filed: Jan. 31, 1997

[51] Int. Cl.$^6$ ........................................................ H04L 9/00
[52] U.S. Cl. ................................................. 380/23; 380/25
[58] Field of Search .................................. 380/23, 25, 30, 380/49, 45

[56] References Cited

U.S. PATENT DOCUMENTS

| | | | |
|---|---|---|---|
| 5,153,919 | 10/1992 | Reeds, III et al. | 380/23 |
| 5,172,414 | 12/1992 | Reeds, III et al. | 380/45 |
| 5,204,902 | 4/1993 | Reeds, III et al. | 380/25 |
| 5,249,230 | 9/1993 | Mihm, Jr. | 380/23 |
| 5,369,705 | 11/1994 | Bird et al. | 380/25 |
| 5,390,252 | 2/1995 | Suzuki et al. | 380/23 |
| 5,402,490 | 3/1995 | Mihm, Jr. | 380/30 |
| 5,615,268 | 3/1997 | Bisbee et al. | 380/25 |
| 5,761,309 | 1/1998 | Ohashi et al. | 380/25 |
| 5,799,084 | 8/1998 | Gallagher et al. | 380/23 |

*Primary Examiner*—Salvatore Cangialosi
*Attorney, Agent, or Firm*—Fenwick & West LLP

[57] ABSTRACT

A system and method for enabling sensitive authentication information to be under the control of the service provider and transmitting only non-sensitive authentication information to the AC, for providing a secure technique for generating sensitive authentication information and for securely transmitting to and storing the information in the mobile system (MS) and a storage device controlled by the service provider, and for enabling a mobile station to utilize features supported by the visited system even if the MS home system does not support the feature. The present invention utilizes a secure authentication center (SAC) and a secure A-key management system (SAMS) to perform authentication. The SAC can be positioned locally in a home system, or it can be centrally located, for example, between systems. The SAC can be connected to many SAMS. Each SAMS stores sensitive authentication information for a group of MS's. During authentication, the SAC generates a request signal to the appropriate SAMS which generates a unique signal based upon the secret authentication data and other data stored therein. However, the sensitive authentication data is not sent to the SAC. The SAC performs authentication using the unique signal transmitted by the SAMS.

35 Claims, 12 Drawing Sheets

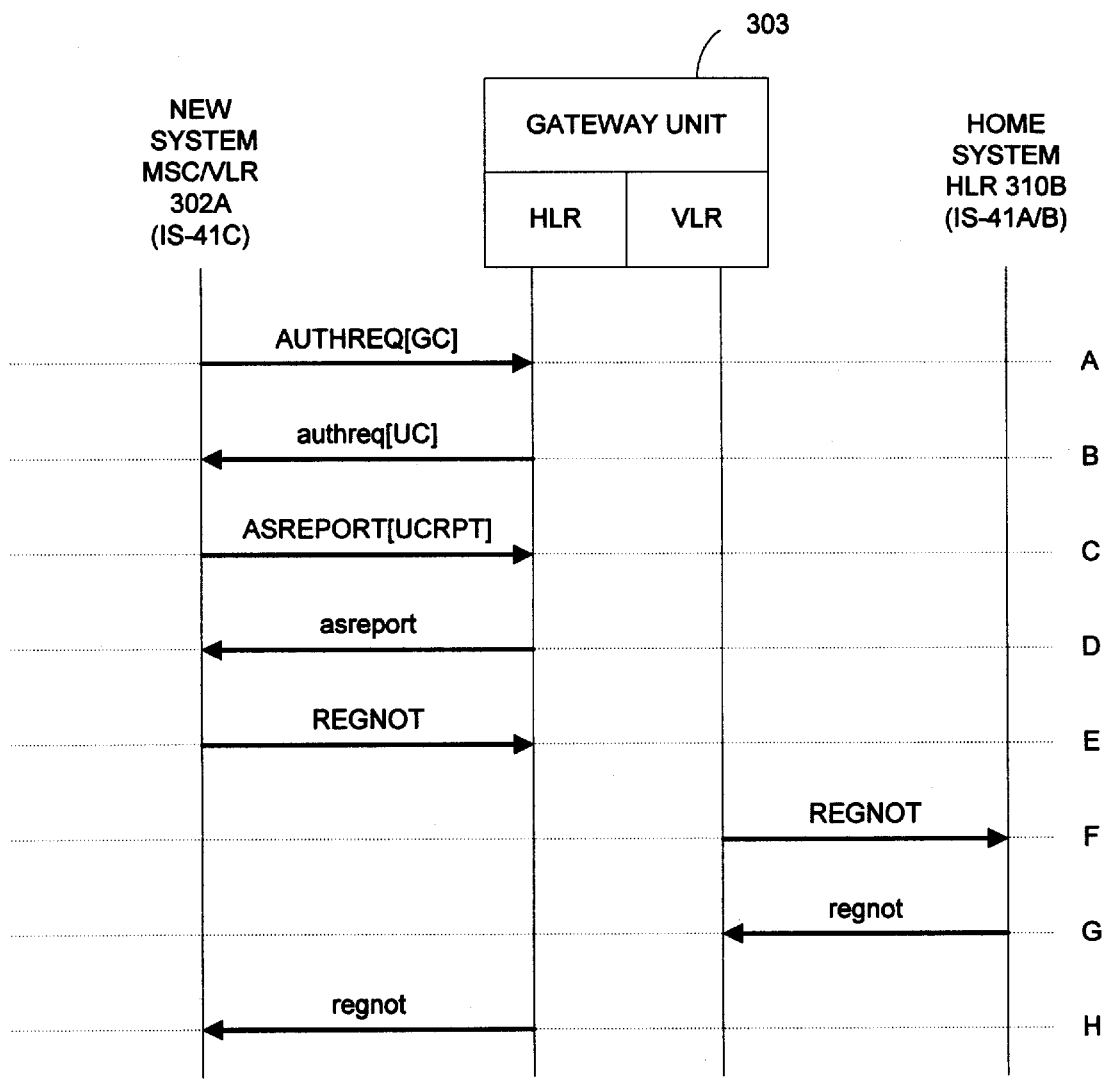

SECURE AUTHENTICATION-KEY MANAGEMENT SYSTEM AND METHOD FOR MOBILE COMMUNICATIONS

RELATED APPLICATIONS

This application is related to U.S. patent application Ser. No. 08/642,215, now abandoned, filed by Michael D. Gallagher et al. on May 6, 1996, entitled "System and Method for Authenticating Cellular Telephonic Communication", Applicants reference number 2398, now U.S. Pat. No. 5,799,084 and U.S. patent application Ser. No. 08/672,662, now abandoned, filed by Michael Gallagher et al. on June 28, 1996, entitled "A Signaling Gateway System and Method", Applicants reference number 2430, now pending and U.S. patent application Ser. No. 08/792,513, now abandoned, filed by Yick Man Chan et al. on January 31, 1997, entitled "Authentication Key System and Method", Applicants reference number 2634, now U.S. Pat. No. 5,850,445 all of which are incorporated by reference herein in their entirety.

BACKGROUND OF THE INVENTION

1. Field of the Invention

The present invention relates generally to the field of communication systems and more particularly to the field of authentication of cellular telephone communication.

2. Description of Background Art

In recent years the use of cellular telephones and cellular communications systems has significantly increased. Many of the early communication systems were based upon analog technology, e.g., the advanced mobile phone system (AMPS). In recent years the protocols used by some of these analog systems have been modified to add features, e.g., call forwarding and authentication. FIG. 1 is an illustration of a conventional cellular communication network The communication network includes a mobile station (MS) 102, e.g., a cellular telephone that is commercially available from Motorola Corporation. The MS 102 transmits an electromagnetic signal to and receives an electromagnetic signal from a base station (BS) 104 via the air. In FIG. 1, the BS 104 is communicating with a first system, e.g., an IS-41C/AMPS system. Typically, a BS 104 is a tower having an antenna and a transceiver.

The MS 102 communicates with a BS 104 whose physical location is near the MS 102. Currently, there are thousands of BS's 104 in the United States. Some of the functions performed by each BS 104B include converting the received electromagnetic signal into an electrical signal, assigning a voice channel to the MS 102, and paging an MS 102. The BS 104 transmits a signal representing a unique MS identifier to a mobile switching center (MSC) using a signaling protocol supported by the MSC. Frequently, in the AMPS system, each MSC/VLR 106A–B and its associated BS's 104A–B are provided by a single manufacturer, e.g., Motorola Corp. Accordingly, a proprietary interface protocol is frequently used to communicate between the BSs 104A–B and the MSC 106A–B. Frequently, the MSC includes a visitor location register (VLR) and together are illustrated in FIG. 1 as an MSC/VLR 106. Currently, there are hundreds of MSC/VLRs 106 in the United States.

The MSC/VLR 106A identifies the home system, e.g., system 2, of the MS 102 and transmits a signal through a signaling network 108, e.g., the signaling system 7 (SS7) which is a standard telecommunication signaling system, to the home system for the purpose of registering the MS 102 using a signaling protocol supported by the MSC/VLR 106A and the home system. Two such signaling protocols are the IS-41B and the IS-41C signaling protocol. The IS-41B signaling protocol is described in greater detail in the Telecommunications Industry Association/Electronic Industries Association (TIA/EIA), Interim Standard IS-41-B, Electronic Industries Association, December 1991 that is incorporated by reference herein in its entirety. The IS-41C signaling protocol is described in greater detail in the TIA/EIA, Interim Standard IS-41-C, Cellular Radio-Telecommunications Intersystem operations, February 1996 that is incorporated by reference herein in its entirety. The home system includes an MSC/VLR 106C and a home location register (HLR) 110B having a profile of the subscriber (registered user) of the MS 102. A subscriber profile includes a copy of the unique MS identifier and indications of the type of services available to the subscriber, e.g., call forwarding and multi-party calling. One purpose of registering the MS 102 with the home system is to enable the MSC/VLR 106A to charge the home system so that the home system can charge the owner of the MS 104 for the cost of the call on the cellular network. If the unique MS identifier matches a stored identifier in the home system, then the home system transmits a registration signal to the MSC/VLR 106A and the user of the MS 102 is then permitted to use the cellular network.

One problem with conventional mobile communication systems occurs when the first system illustrated in FIG. 1 supports a protocol, e.g., IS-41C, that is compatible with the protocol supported by the second system, e.g., IS-41B, but the first system offers more features to the user, e.g., authentication. In conventional systems, the MS 102 can not take advantage of the additional features offered by the first system when traveling through the area supported by the first system. For example, a significant problem with current cellular networks is fraud. Specifically, the signal between the MS 102 and the BS 104A can be intercepted by an unauthorized source. The unauthorized source can determine the unique MS identifier included in the intercepted signal and can then program a fraudulent MS to transmit the intercepted MS identifier. As a result, the unauthorized source utilizes the cellular network and the cost of this use is charged to the subscriber whose MS identifier was intercepted. Some estimates of the monetary losses from this type of fraud range from $2 million to $3 million per day, as of 1996. Fraud typically occurs more frequently in larger cities. Accordingly, many system providers in the larger cities have upgraded the signaling protocol in order to include an authentication feature. For example, the IS-41C signaling protocol supports authentication while the IS-41A and IS-41B signaling protocols do not support authentication. Conventional systems do not permit an MS 102 to utilize the authentication capabilities (or other additional features) of the IS-41C signaling protocol while traveling through an area supported by the first system if the home system does not support authentication (or other additional features), e.g., if the home system only supports the IS-41B signaling protocol. The authentication standards developed by the TIA, for example the TSB51, are described in TIA/EIA, Telecommunications System Bulletin—TSB51, Cellular Radiotelecommunications: Authentication, Signaling Message Encryption and Voice Privacy, May 1993, that is incorporated by reference herein in its entirety, and the TIA IS-41-C. The TIA air interface standards are: IS-54-B that is described in TIA/EIA, Interim Standard IS-54-B, Cellular System Dual-Mode Mobile Station—Base Station Compatibility Standard, April 1992; IS-88, described in TIA/EIA, Interim Standard IS-88, Mobile Station—Land Station Compatibility Standard for Dual-Mode Narrowband Analog Cellular Technology, January, 1993; IS-91, described in TIA/EIA Interim Standard IS-91, Mobile Station—Base Station Compatibility Standard for 800 MHz Analog Cellular, October, 1994; IS-95-A, described in TIA/EIA, Interim Standard IS-95-A, Mobile Station—Base Station Compatibility Standard for Dual-Mode Wideband Spread Spectrum Cellular Systems, May, 1995; and IS-136, described in TIA/EIA, Interim Standard IS-136, 800 MHz TDMA Cellular—Radio Interface—Mobile Station—Base Station Compatibility, December, 1994, that are all incorporated by reference herein in their entirety. In addition, a more detailed description of the SS7 network is described in the American National Standards Institute, Inc. (ANSI), American National Standard for Telecommunications, Signaling System Number 7 (SS7)—General Information; Exchange Carriers Standards Association Committee T1; T1.111-1992 which is incorporated by reference herein in its entirety.

A second problem with conventional mobile communication systems when authentication capability is provided is that sensitive authentication information, e.g., the authentication key (A-key), is accessible by an authentication center (AC) system administrator or other network entity. It would be preferable to increase the security of the mobile communication system by limiting access to such sensitive authentication information only to the MS service provider such that the AC system administrator or other network entity, who may not be directly associated with the MS service provider, does not have access to the sensitive authentication information. However, in conventional mobile communication systems the AC requires access to the sensitive authentication information when performing MS authentication and, therefore, the sensitive authentication information can be available to non-MS service providers.

A third problem with conventional mobile communication systems is that if the sensitive authentication information, e.g., the A-key, is pre-programmed in the MS 102, it must be transmitted to the AC in the home system before activating the MS 102. This presents several security concerns. For example, if the A-key is pre-programmed into the MS 102, the value of the A-key must be sent to the home system before activating the MS 102. In conventional systems the value of the A-key is either transmitted electronically, e.g., via a data network, or is written and sent to the service provider. These techniques are not secure since they utilize a person at one or both ends that obtain access to the sensitive authentication information For example, if an MS 102 is sold at a retail store, part of the MS activation process (when the service provider provides an authentication procedure) requires that the A-key be sent from the service provider to the retail store for programming into the MS 102. This can mean that the retail clerk obtains access to the sensitive authentication information. What is needed is a more secure technique for transmitting sensitive authentication information between the service provider and the MS 102.

Accordingly, what is needed is a system and method for (1) enabling sensitive authentication information to be under the control of the service provider and transmit only non-sensitive authentication information to the AC; (2) providing a secure technique for generating sensitive authentication information and for securely transmitting to and storing the information in the MS 102 and a storage device controlled by the service provider; and (3) enabling a mobile station to utilize features supported by the visited system, e.g., authentication, even if the MS home system does not support the feature.

SUMMARY OF THE INVENTION

The invention is a system and method for enabling sensitive authentication information to be under the control of the service provider and transmitting only non-sensitive authentication information to the AC, for providing a secure technique for generating sensitive authentication information and for securely transmitting to and storing the information in the mobile system (MS) and a storage device controlled by the service provider, for enabling a mobile station to utilize features supported by the visited system even if the MS home system does not support the feature.

The present invention utilizes a secure authentication center (SAC) and a secure A-key management system (SAMS) to perform authentication. The SAC can be positioned locally in a home system, or it can be centrally located, for example, between systems. The SAC can be connected to many SAMS. Each SAMS stores sensitive authentication information for a group of MS's. During authentication, the SAC generates a request signal to the appropriate SAMS which generates a unique signal based upon the secret authentication data and other data stored therein. However, the sensitive authentication data is not sent to the SAC. The SAC performs authentication using the unique signal transmitted by the SAMS. The present invention enables a service provider to limit access to the sensitive authentication information by limiting the location of the sensitive authentication information to the SAMS and the MS. The centralized SAC can be used with many SAMS without having access to the sensitive authentication information.

The present invention is also a system and method for automatically securely generating and programming an MS and SAMS with the sensitive authentication information while significantly reducing the risk of misappropriation of the sensitive authentication information. The risk of misappropriation is reduced since the sensitive authentication information (or other sensitive information) need not be pre-programmed into the MS, or if it is pre-programmed, the sensitive authentication information can be re-programmed, thereby reducing the potential access to the information by unauthorized people before the MS is sold. In addition, the risk of misappropriation is reduced since the generation and programming system and method is performed automatically using a secured communication technique.

BRIEF DESCRIPTION OF THE DRAWINGS

FIG. 11 is an example of a registration signaling process including authentication according to one embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digits of each reference number correspond to the figure in which the reference number is first used.

Figure 1:
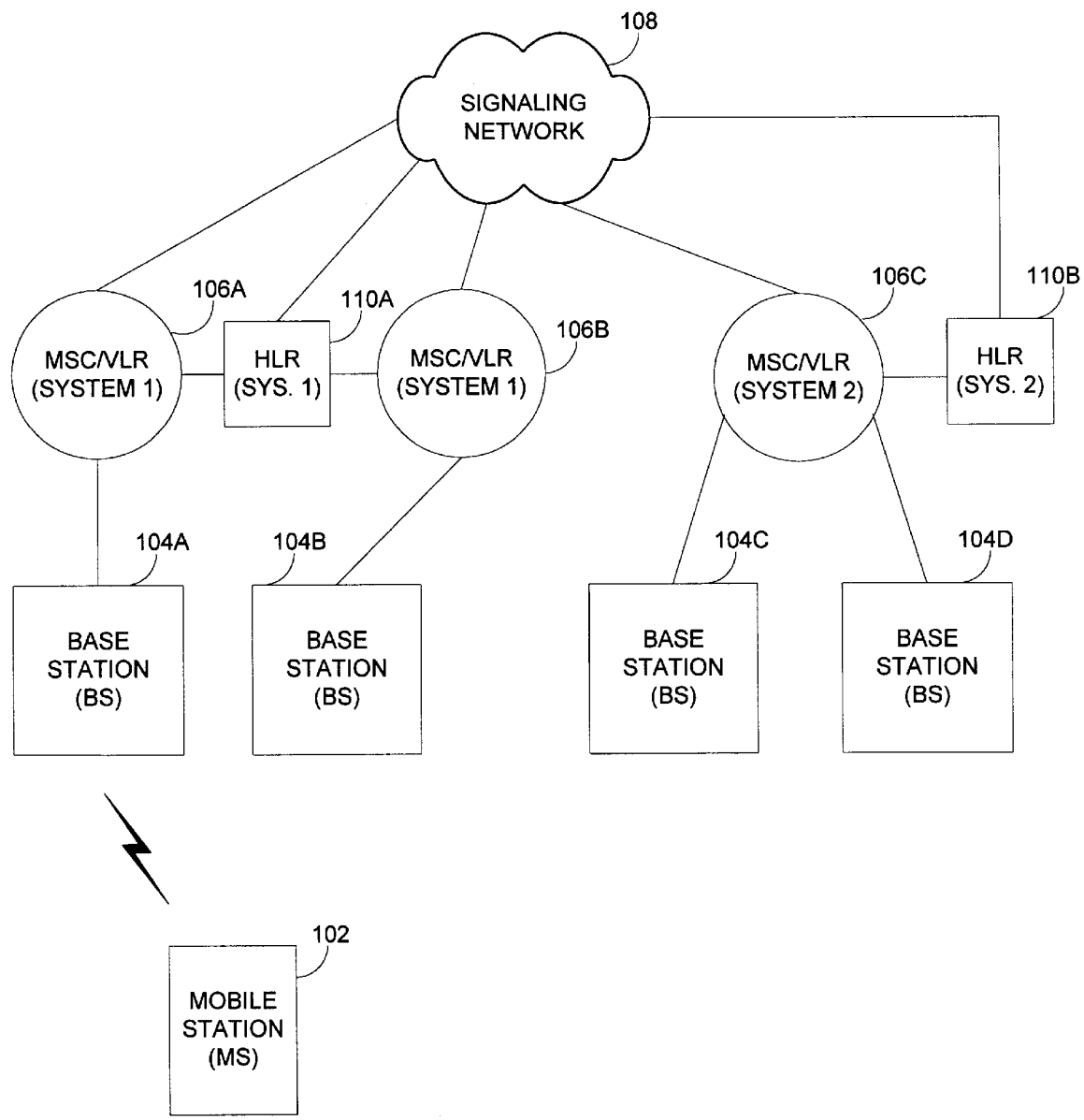
FIG. 1 is an illustration of an example of a cellular network topology including a signaling network coupled between first and second communication systems.
Figure 2:
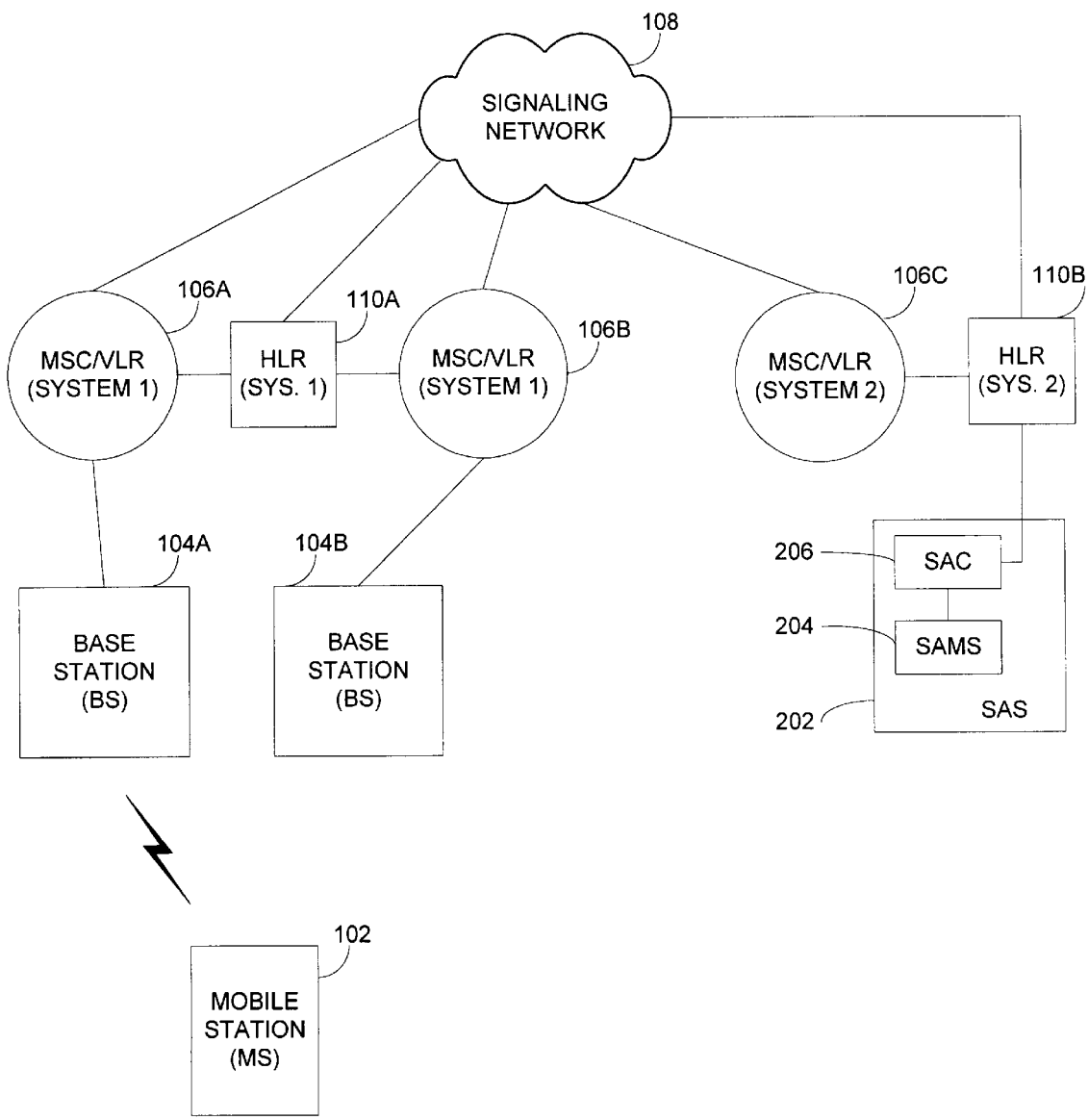
FIG. 2 is an illustration of an example of a cellular network topology having a local authentication system in one system having an A-key management system according to one embodiment of the present invention.

FIG. 2 is an illustration of an example of a cellular network topology having an authentication system, e.g., a secure authentication system (SAS) 202, in one mobile system, having a secure A-key management system (SAMS) 204 and a secure authentication center (SAC) 206, that are commercially available from Synacom Technology, Inc., San Jose, Calif., according to one embodiment of the present invention. The SAC 206 can be part of the SAS 202 or the HLR 110B. The SAC 206 and the SAMS 204 are described in greater detail below The SAMS 204 is a device that stores sensitive authentication information, e.g., an authentication key (A-key), whose access is controlled by a mobile station service provider. Such service providers frequently maintain billing records and identify the level of service for each MS 102. In the preferred embodiment of the present invention, the service provider maintains control of the sensitive authentication information. In order to increase the security of the authentication process, only the MS 102 and the SAMS 204 store the sensitive authentication information in the preferred embodiment of the present invention.

Figure 3:
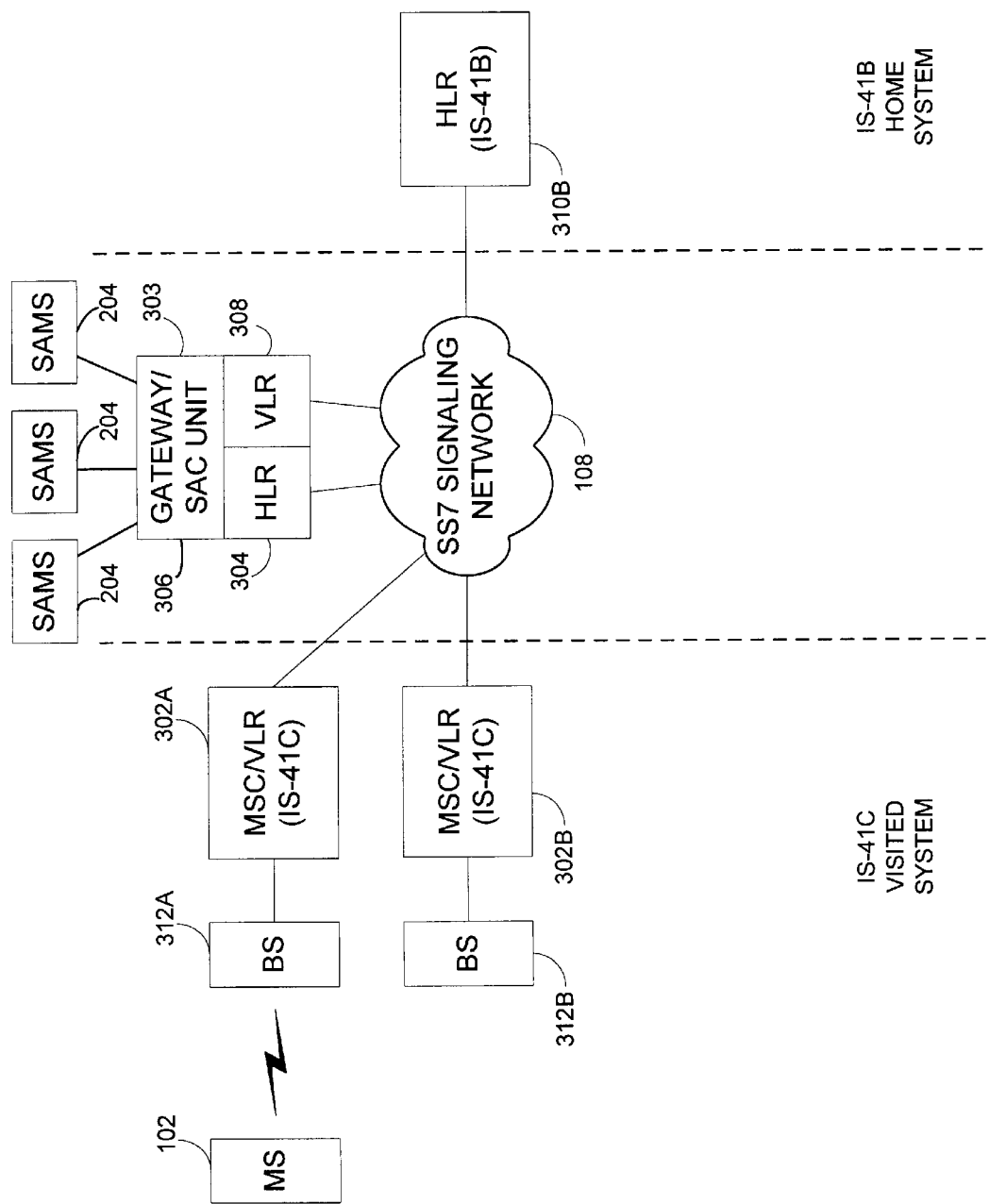
FIG. 3 is an illustration of an example of a cellular network including a signaling gateway disposed between the first and second systems, the signaling gateway coupled to several A-key management systems that are controlled by a service provider according to the preferred embodiment of the present invention.

FIG. 3 is an illustration of an example of a cellular network including a signaling gateway disposed between the first and second systems, the signaling gateway can be coupled to several A-key management systems that are controlled by a service provider according to the preferred embodiment of the present invention. The cellular network includes an IS-41C visited system having two base stations (BSs) 312A–B, and two mobile switching centers/visitor location registers (MSC/VLR) 302A–B. Each MSC/VLR 302 is connected to a signaling network, e.g., the signaling system 7 (SS7), described above. The SS7 108 is disposed between the visited system and a home system. The home system is the system that includes the home location register (HLR) 310B for a particular mobile station (MS) 102. Since the MS 102 can be physically located outside an area supported by the home system, BSs 104A–B of other systems can receive the electromagnetic signals transmitted from the MS 102. The system in which these BSs 104A–B are located is called the visited system. As described above, in order to provide a proper accounting of the costs involved in the cellular communication session, the MSC/VLR 302 of the visited system communicates with the HLR 310B of the home system. However, the protocol utilized by the visited system, e.g., the IS-41C protocol, and the protocol utilized by the home system, e.g., the IS-41B protocol, may not be compatible or the protocols can be compatible but the protocol supported by the home system may not support all of the features supported by the protocol used by the visited system. For example, authentication is supported by the IS-41C protocol but is not supported by the IS-41B protocol. In the present invention a signaling gateway, e.g., a gateway/SAC system 303 is coupled to the SS7 signaling network 108. The signaling gateway 303 receives signals transmitted by the home system's HLR 310B and signals transmitted by the MSC/VLR 302A–B of the visited system. A benefit of this configuration is that the signaling gateway is located outside of both the visited system and the home system and, therefore, can be utilized by many systems as opposed to only the system in which it is located. However, since many systems, and accordingly, many service providers, can utilize the features of the signaling gateway, e.g., the authentication feature, the service providers may not be able to ensure the security of the sensitive authentication information since they do not maintain control over the administrators of the signaling gateway 303 who have access to the sensitive authentication information, e.g., the A-key, in conventional communication systems.

The present invention permits each service provider to maintain sensitive authentication information in a SAMS 204 that can be solely under the control of the service provider. Each service provider can maintain a separate SAMS 204 that can be coupled to the signaling gateway 303. The operation of the gateway/SAC system 303 and the SAMS is described in greater detail below. In an alternate embodiment, signaling gateway/SAC systems 303 can be coupled directly to any or all of the communication systems, i.e., a signaling gateway/SAC system 303 can be positioned between the signaling network 108 and each system. The signaling gateway/SAC system 303 includes a gateway HLR 304, a gateway/SAC unit 306, and a gateway VLR 308. The operation of one type of gateway unit is described in co-pending U.S. patent application Ser. No. 08/672,662, filed by Michael Gallagher et al. on Jun. 28, 1996, entitled "A Signaling Gateway System and Method", that was incorporated by reference above. Another benefit of the communication system using the signaling gateway/SAC system 303 in comparison to conventional systems, is that when a service provider that is located in a system that does not support authentication, e.g., the service provider of system 2 (using the IS-41B protocol) the communication system can still support authentication if the signaling gateway/SAC system 303 handles the authentication functions, as described below.

Figure 4:
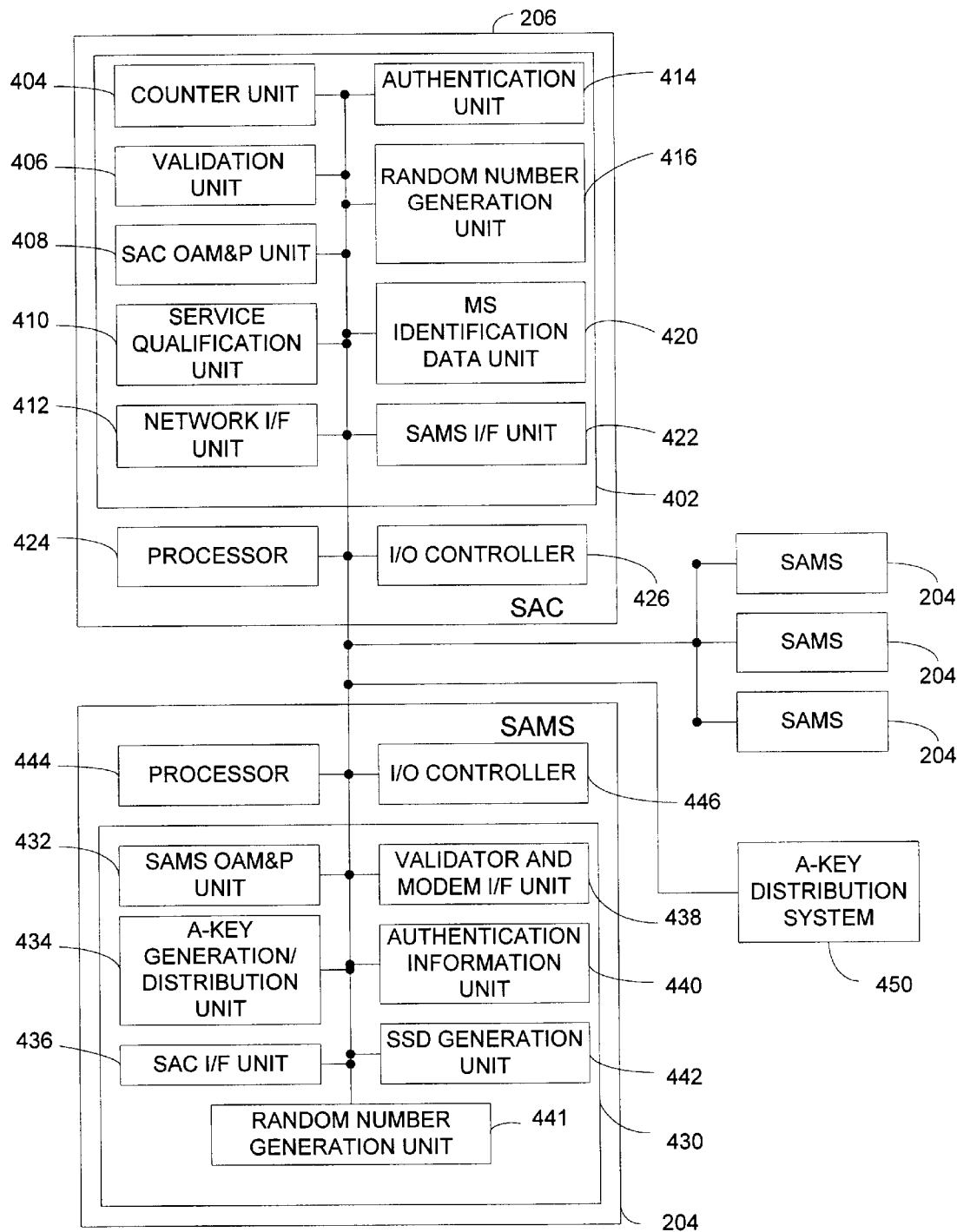
FIG. 4 is a more detailed illustration of the authentication center and the A-key management system according to the preferred embodiment of the present invention.

FIG. 4 is a more detailed illustration of the authentication center and the A-key management system according to the preferred embodiment of the present invention. A SAC 206 is coupled to one or more SAMS 204. The SAC 206 can be local, as illustrated in FIG. 2, or centralized by being part of or configured to operate with a signaling gateway/SAC system 303, as illustrated in FIG. 3. The SAC 206 includes a SAC memory module 402, which can be a conventional non-volatile storage device, that can include a counter unit 404, a validator unit 406, a SAC operations, administration, maintenance, and provisioning (OAM&P) unit 408 which is a user interface that enables a SAC administrator to perform administrative and maintenance operations on the SAC 206, for example, a service qualification unit 410, a network interface unit 412, an authentication unit 414, a random number generation unit 416, an MS identification data unit 420, and a SAMS interface unit 422. The SAC 206 also includes a conventional processor 424, e.g., an Alpha microprocessor that is commercially available from Digital Equipment Corporation (DEC), Palo Alto, Calif., and a conventional input/output (I/O) controller 426. The operation of the SAC 206 will be described in greater detail below.

The SAMS 204 includes a conventional processor 444, e.g., an Ultra Enterprise server, that is commercially available from Sun Microsystems, Inc., Mountain View, Calif., a conventional I/O controller 446 and a SAMS memory module 430. The SAMS memory module 430 can be a conventional non-volatile storage device and includes a SAMS OAM&P unit 432 that is a user interface to the SAMS to enable a SAMS administrator to search the SAMS 204, if authorized to do so, and perform various administrative and maintenance operations and to generate reports concerning A-keys or validator units, for example, an A-key generation/distribution unit 434, a SAC interface unit 436, a validator and modem interface unit 438, an authentication information unit 440, a random number generation unit 441, and a shared secret data (SSD) generation unit 442. As described above, one feature of the present invention is the generation and programming of an A-key in the SAMS 204 and the MS 102. In order to perform this function, the SAMS 204 is coupled to an A-key distribution system 450 which is now described.

Figure 5:
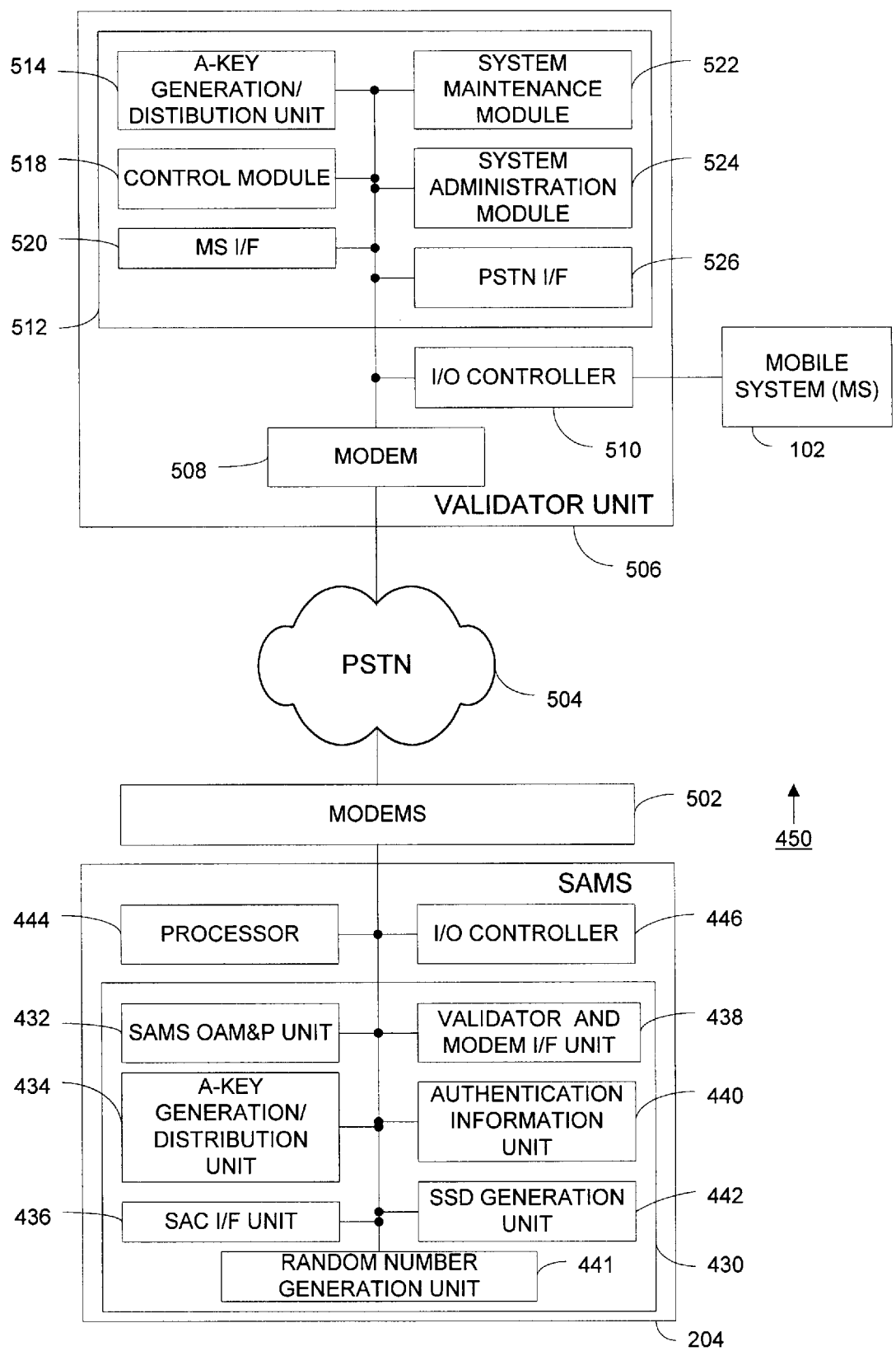
FIG. 5 is a more detailed illustration of the A-key management system and the A-key distribution system including the automatic A-key programmer, according to the preferred embodiment of the present invention.

FIG. 5 is a more detailed illustration of the A-key management system, e.g., the SAMS, and the A-key distribution system including the automatic A-key programmer 506, e.g., validator unit 506 that is commercially available from Synacom Technology, Inc., San Jose, Calif., according to the preferred embodiment of the present invention. The validator unit 506 includes a conventional modem 508, a conventional I/O controller 510, and a validator unit memory module 512. The validator unit modem is coupled to the SAMS modem 502 via a network, e.g., the public switched telephone network (PSTN) 504, The SAMS memory module 512 includes an A-key generation/distribution unit 514, a control module 518, an MS interface 520, a system maintenance module 522, a system administration module 524, and a PSTN interface 526 which enables the validator unit to communicate with the PSTN via a conventional analog telephone interface, e.g., an RJ-11 interface. The I/O controller 510 can also be coupled to an MS 102 using an interface defined by the MS manufacturer and is stored in the MS interface 520. The operation of the A-key distribution system is described below. The system administrator module 524 enables a user to set or modify the telephone number of the SAMS 204, to set or modify the terminal location identifier, to add or modify a terminal identifier, to alter an administrator password, and to perform other administrative functions. The system maintenance module 522 enables a validator unit administrator (not shown) to modify the hardware or software and to perform other maintenance operations.

As described above, an MS 102 is more secure if at least some sensitive authentication data is not preprogrammed into the MS 102. In addition, it is preferable that a clerk at a point of sale terminal does not have access to the sensitive authentication information when the MS 102 is being programmed. The present invention satisfies these conditions. It is preferable that an MS 102 be programmed (or re-programmed) with sensitive authentication information at the point of sale of the MS 102. This will enable the MS to be quickly activated with the authentication feature. The present invention is described with respect to generating and programming the A-key into the MS 102 and the SAMS 204. It will be apparent to persons skilled in the art that alternate or additional data can be generated and programmed using the technique described herein.

Figure 6:
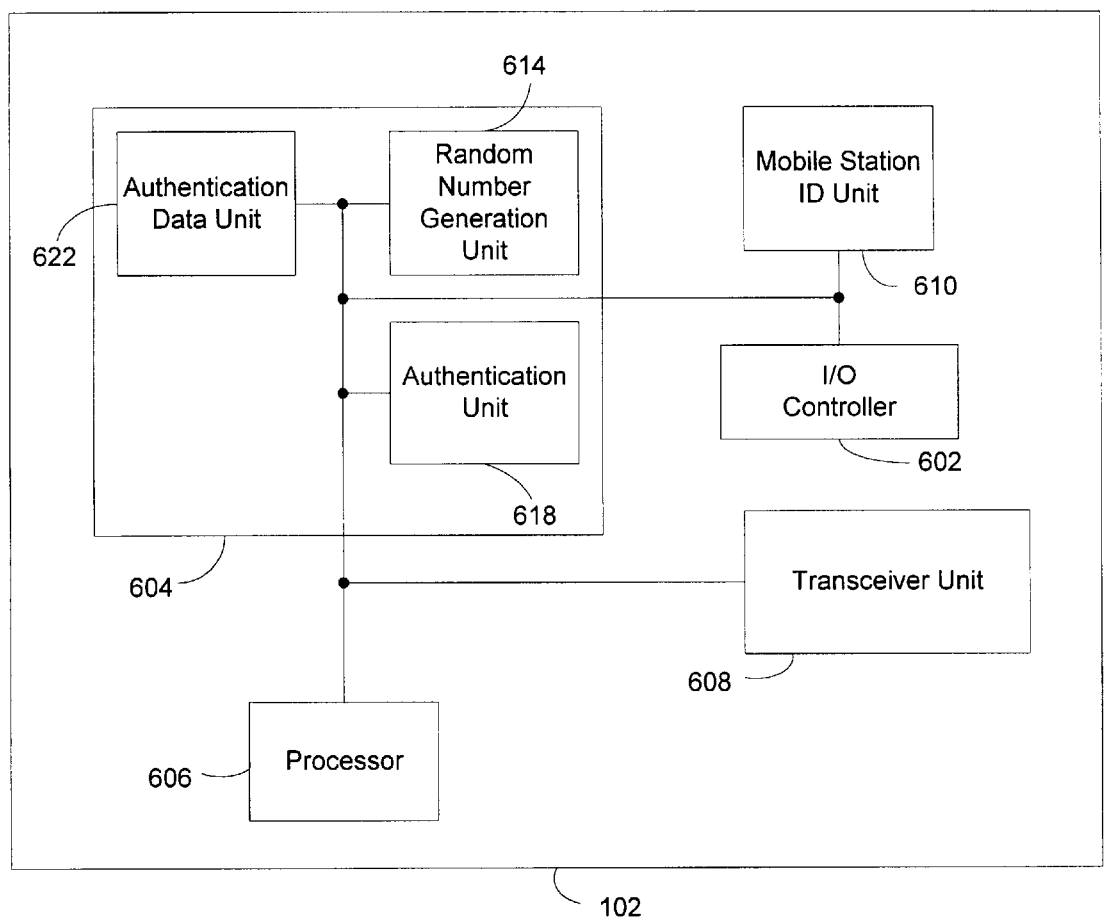
FIG. 6 is an illustration of a mobile system according to the preferred embodiment of the present invention.

FIG. 6 is an illustration of an MS 102 according to the preferred embodiment of the present invention. The MS 102 includes a conventional I/O controller 602 for receiving, inter alia, signals from the validator unit, a mobile station ID unit 610 that stores the unique electronic serial number (ESN) and mobile identification number (MIN) of the MS 102, a transceiver unit 608 for transmitting signals to and receiving signals from various BS's 104, 312, a conventional processor, and an MS memory module 604. The MS memory module 604 can be a conventional storage device that includes the following non-conventional functional units in the form of, for example, computer programs. The MS memory module 604 includes an authentication data unit 622, an authentication unit 618, and a random number generation unit 614. The operation of the MS 102 when operating with the A-key distribution system and when operating with the mobile communication systems is described below.

Figure 7:
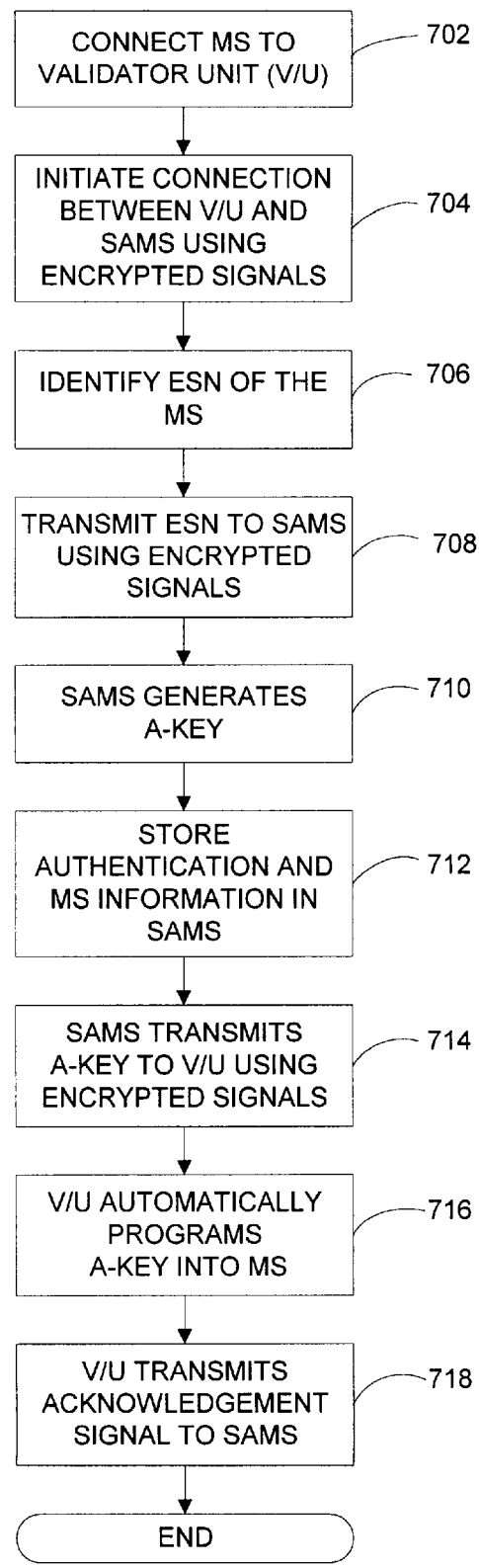
FIG. 7 is a flowchart illustrating the process of securely and automatically programming an A-key into a mobile system.

The operation of the A-key distribution system is now described with reference to FIGS. 5–7. FIG. 7 is a flowchart illustrating the process of securely and automatically programming an A-key into a mobile system. As described above, each operating MS 102 typically includes sensitive authentication data such as the ESN and the A-key. The present invention provides a system and method for generating and storing all or a subset of the sensitive authentication information. The generation of the A-key, for example, can be performed when the MS 102 is purchased or when it is advantageous to replace an old A-key, for example. The example set forth below will describe the situation where the A-key is programmed at the point of sale. After selling the MS 102 to a user, the MS 102 is typically activated by a salesperson or clerk at the point of sale. Currently, the activation process can include placing a telephone call to the service provider and identifying the ESN of the MS 102 along with any other sensitive authentication information. The service provider will record this information, provide the necessary sensitive authentication information to the sales agent who programs the MS 102 with the sensitive authentication information. The sales clerk verifies the completion of the programming to the service provider and the service provider activates the MS 102 in its system. In the preferred embodiment, the clerk will connect 702 the MS 102 to the validator unit 506 and will initiate 704 a secure connection between the validator unit 506 and the SAMS 204 using encrypted signals. After establishing a connection the validator unit control module 518 generates an A-key generation request signal. The PSTN interface 526 formats the signal and the modem 508 modulates the digital signal to an analog signal and transmits the signal over the PSTN 504. A modem or, preferably, a conventional bank of modems 502, e.g., the U.S. Robotics Total Control Enterprise Network Hub that is commercially available from U.S. Robotics, Skokie, Ill., convert the received signals to digital signals which are received by the SAMS I/O controller 446 and interpreted by the validator and modem interface unit 438 which determines that the received signal is an A-key generation request signal. The A-key generation/distribution unit 434 uses a protocol that, without any prior arrangements, can generate an agreed upon secret key that is known only to the validator unit 506 and SAMS 204. This secret key can then be used to encrypt the communication signals sent between the validator unit 506 and SAMS 204 using an encryption algorithm.

In the preferred embodiment, the validator unit 506 and SAMS 204 use the Diffie-Hellman public key algorithm to generate a secret key for use in the RC4 encryption algorithm, as described. It will be apparent that alternate secret key generation and encryption techniques can be used without departing from the scope of the present invention. A more detailed description of the Diffie-Hellman algorithm is found in W. Diffe and M. E. Hellman, "New directions in Cryptography," IEEE Transactions on Information Theory, v. IT-22, n.6, November 1976, pp. 644–654. The Diffie-Hellman key algorithm provides a method for two parties to each compute the same secret key without exchanging secret information. Its security stems from the difficulty of computing discrete logarithms modulo a prime number. It takes little time to exponentiate modulo a prime number, but much more time to compute the inverse, i.e., the discrete logarithm. The A-key generation/distribution unit 434 in the SAMS 204 generates the Diffie-Hellman (DH) parameters, e.g., a prime number (p) having a length of "k" bytes, and an integer (g) that is greater than zero but less than "p", that is called the base. The A-key generation/distribution unit 434 then randomly or pseudo-randomly generates a private value (x), whose value is greater than zero but less than "p", and computes a public value "y" according to equation (1).

$$y = g^x \text{ modulo } p \qquad \text{Equation (1)}$$

The A-key generation/distribution unit 434 then transmits its public value (y) and the DH parameters (p and g) to the validator unit 506. The validator A-key generation/distribution unit 514 then calculates its public value (y') and private value (x') based upon the DH parameters. The validator A-key generation/distribution unit 514 then generates the secret key (Z) in accordance with equation (2).

$$Z = (y)^{x'} \text{ modulo } p \qquad \text{Equation (2)}$$

The validator A-key generation/distribution unit 514 identifies 706 the ESN of the MS 102 by reading the information from the MS identification unit 610. The validator A-key generation/distribution unit 514 then encrypts the ESN of the MS 102 using the RC4 encryption algorithm. The RC4 encryption algorithm is described in greater detail in K. R. Stamberger, "The RC2 and RC4 Exportable Encryption Algorithms," RSA Data Security, Inc. (Feb. 12, 1993). In general, the RC4 algorithm is a symmetric stream encryption algorithm. A stream cipher processes the input data a unit at a time. A unit of data is generally a byte, or bit. In this way, encryption or decryption can execute on a variable length of input. The algorithm does not have to wait for a specified amount of data to be input before processing, or append and encrypt extra bytes. RC4 is actually a keyed pseudo-random sequence. It uses the provided key to produce a pseudo-random number sequence which is logically combined using an exclusive-OR (XOR) operation with the input data. As a result the encryption and decryption operations are identical. The number of key bits is variable and can range from eight to 2048 bits.

The unencrypted public value (y') and the encrypted value of the ESN are then transmitted 708 to the SAMS 204. The SAMS A-key generation/distribution unit 434 generates the secret key (Z) in accordance with equation (3).

$$Z = (y')^x \text{ modulo } p \qquad \text{Equation (3)}$$

It will be apparent to persons skilled in the art that the SAMS 204 and the validator unit 506 have each calculated the same value for the secret key without exchanging any secret information. The SAMS A-key generation/distribution unit 434 then decrypts the ESN of the MS 102 using the RC4 algorithm and the secret key (Z). The SAMS A-key generation/distribution unit 434 then generates 710 the A-key.

In the preferred embodiment the A-Key is a 20 digit (64 bit) random number and a 6 digits checksum. The SAMS A-key generation/distribution unit 434 generates a 20-digit pseudo-random number based on a random seed. In the preferred embodiment the random-seed is the time of day. After generating the 20 digit pseudo-random value, the A-key generation/distribution unit 434 generates a checksum for an A-key. In a case where the number of digits in the pseudo-random number is less than 20, the leading most significant digits will be set to zero. The checksum provides a check for the accuracy of the A-Key. The 20 A-Key digits are converted into a 64-bit representation and along with the ESN are input to the TIA standard Cellular Authentication and Voice Encryption (CAVE) algorithm that is described in TIA, TR45.0.A, Common Cryptographic Algorithms, Revision B, May 9, 1995, which is incorporated by reference herein in its entirety. The CAVE algorithm generates an 18-bit result that is the A-Key checksum. The checksum is returned as 6 decimal digits. In the preferred embodiment, the A-key is the concatenation of the 20 digit pseudo random number and the 6 digit checksum. It will be apparent that different algorithms can be used to generate the A-key without departing from the scope of the present invention.

After generating 710 the A-key, the SAMS 204 stores 712 the authentication information, e.g., the A-Key, MS information, e.g., the ESN of the MS 102, and additional information, e.g., a validator unit identifier to identify the validator unit 506, in the SAMS authentication information unit 440, which can be in the form of a database, for example. The SAMS A-key generation/distribution unit 434 then encrypts the A-key and transmits 714 the encrypted A-key to the validator unit 506. The validator unit 506 decrypts the signal using the secret key to identify the A-key. The validator A-key generation/distribution unit 514 along with the MS interface 512 and the I/O controller 510 automatically and securely programs 716 the A-key into the authentication data unit 622 of the MS 102. The clerk or validator unit operator does not have access to the A-key since the validator unit 506 programs the MS 102 without requiring any intervention from the validator unit operator once the connections between the validator unit 506 and the MS 102 and between the validator unit 506 and the SAMS 204 have been established. The validator A-key generation/distribution unit 514 can transmit 718 an acknowledgment signal to the SAMS 204 to indicate that the A-key programming operation has been successful. Accordingly, the above described system generates and programs an A-key into an MS 102 at a remote location, e.g., at the point of sale of the MS 102, in a secure manner and without requiring human intervention after the connections are established.

As described above, two topographies in which the present invention can operate are illustrated in FIGS. 2 and 3. In FIG. 2 the SAC 206 and SAMS 204 are local to system 2 and receive signals via the HLR 110B. In FIG. 3 the SAMS 204 and the SAC unit, e.g., the SAC in the gateway/SAC unit 303, are centrally located in that the authentication function can be performed outside of the home system, e.g., without authentication signals being received by the HLR 310B although the SAMS 204 can be located in the home system, for example. The present invention operates in both topographies by utilizing the SAMS 204 to maintain and protect all sensitive authentication information while providing the necessary information to the SAC 206 or the gateway/SAC unit 303. The technique for authenticating an MS 102 in each of these topographies is now described.

Figure 8:
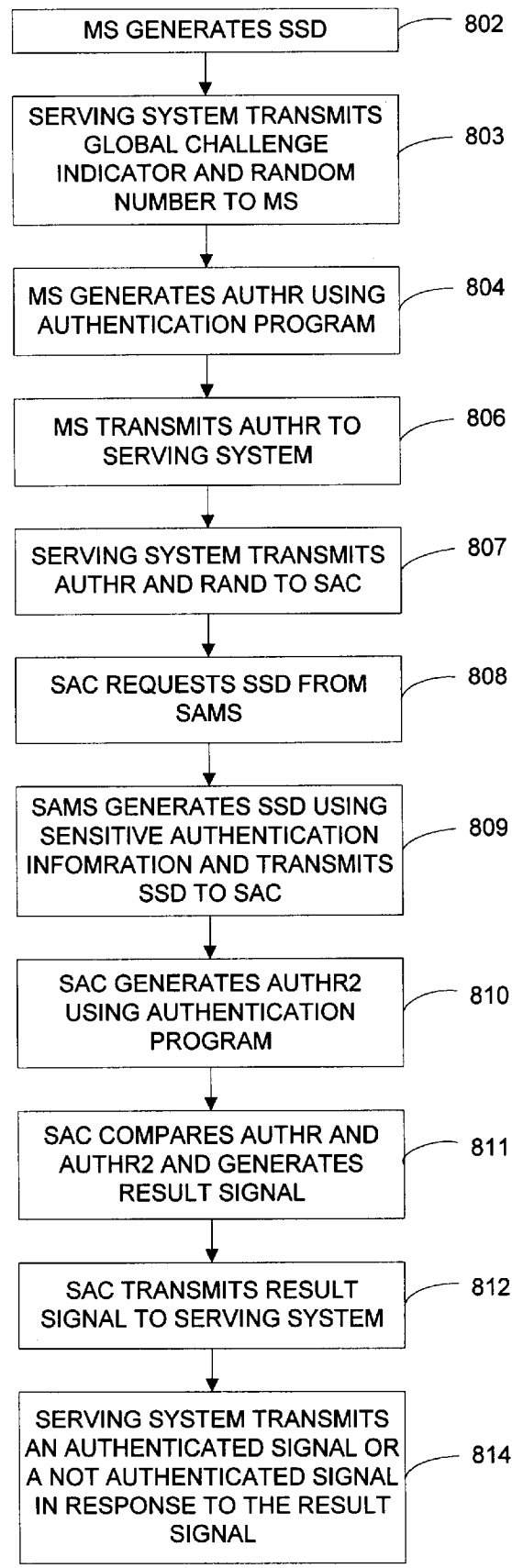
FIG. 8 is a flow chart illustrating an authentication process for a local SAC-SAMS topography according to the preferred embodiment of the present invention.

FIG. 8 is a flow chart illustrating an authentication process for a local SAC-SAMS topography according to the preferred embodiment of the present invention. The present invention can be implemented using a variety of techniques. It will be apparent to persons skilled in the relevant art that various changes in the implementation details of the authentication technique can be made without departing from the scope of the present invention. FIG. 8 illustrates the authentication process for MSs 102 served by IS-41 based systems using the TIA standard Cellular Authentication and Voice Encryption (CAVE) algorithm, described above. In the preferred embodiment, the MS 102 is authenticated when registering in a new system, e.g., when the MS 102 is turned on or when the MS 102 transitions between two systems, e.g., two MSCs. In addition, the MS 102 can be authenticated when originating a call on the cellular network. It is envisioned that the authentication procedure can also be implemented at other times.

The MS 102 generates 802 an SSD signal using the authentication unit 618. The value of the SSD signal can be stored in the authentication data unit 622. The system serving the MS 102, e.g., the visited system, transmits 803 a global challenge indicator and a random number, e.g., RAND, to the MS 102. In response to the global challenge signal, the MS generates 804 an authentication signal (AUTHR) using the authentication program, e.g., the CAVE algorithm described above. The authentication program can have the SSD signal, the MIN signal, the ESN signal, and the RAND signal as inputs. The MS 102 then transmits 806 the determined authentication signal to the serving system, e.g., to the MSC/VLR 106A, 302A of the visited system. The MSC/VLR 106A, 302A of the serving system transmits 807 the authentication signal (AUTHR2) and the random number (RAND) to the SAC 206, 306 via the HLR 110B of the home system or the gateway HLR 304 of the gateway/SAC system 303, for example. If the SAC 206, 306 does not have a value for the SSD or if the SAC 206, 306 wants to update the SSD signal, the SAC 206, 306 transmits 809 an SSD request signal 808 to the SAMS 204. The SAMS 204 calculates the SSD2 value using the sensitive authentication information and the authentication algorithm, e.g., the CAVE algorithm, and transmits 809 the SSD2 signal to the SAC 206, 306 which stores the SSD2 value in the MS identification data unit 420. The SAC 206, 306 then calculates 810 an authentication signal (AUTHR2) using it's stored value of the SSD2, MIN, ESN, and the RAND signal as inputs to the authentication algorithm, e.g., the CAVE algorithm. The SAC 206, 306 determines whether the authentication signal received from the MSC/VLR 106A, 302A matches the authentication signal calculated by the SAC 206, 306 and generates 811 either a "pass" or "fail" result signal based upon this determination. The SAC 206, 306 then transmits 812 the result signal to the MSC/VLR 106A, 302A of the serving system which transmits 814 an authenticated signal or a not-authenticated signal to the MS 102 based upon the result signal.

One feature of the present invention is that the SAC 206 independently determines the value of the authentication signal without having access to sensitive authentication information, e.g., the A-key. As described above, in the preferred embodiment, the SAC 206 requests 808 that the SAMS 204 generate a shared secret data signal (SSD2). This SSD request signal can include a MIN signal, an ESN signal, and, optionally, an indication of the authentication algorithm to be used, e.g., a version number. The SAMS SSD generation unit 442 uses these signals to generate an SSD2 value using, for example, the CAVE algorithm. The SAMS 204 generates the random number used to generate the SSD2 and transmits the SSD2, and a random number (RANDSSD) used to generate the SSD2 that is generated in the random number generation unit 441 in the SAMS 204 to the SAC 206, 306 using the SAC interface unit 436 and the I/O controller 446. If the MS 102 is authentic, the SSD2 value should be equal to the SSD value generated by the MS 102. The SAC authentication unit 414 receives signals representing SSD2, RAND, MIN, and ESN and implements the same authentication algorithm used in the MS 102, e.g., the CAVE algorithm, using the received signal as inputs.

The authentication procedure described above is accomplished without the SAC 206 receiving or having access to sensitive authentication information, e.g., the A-key.

Figure 10A:
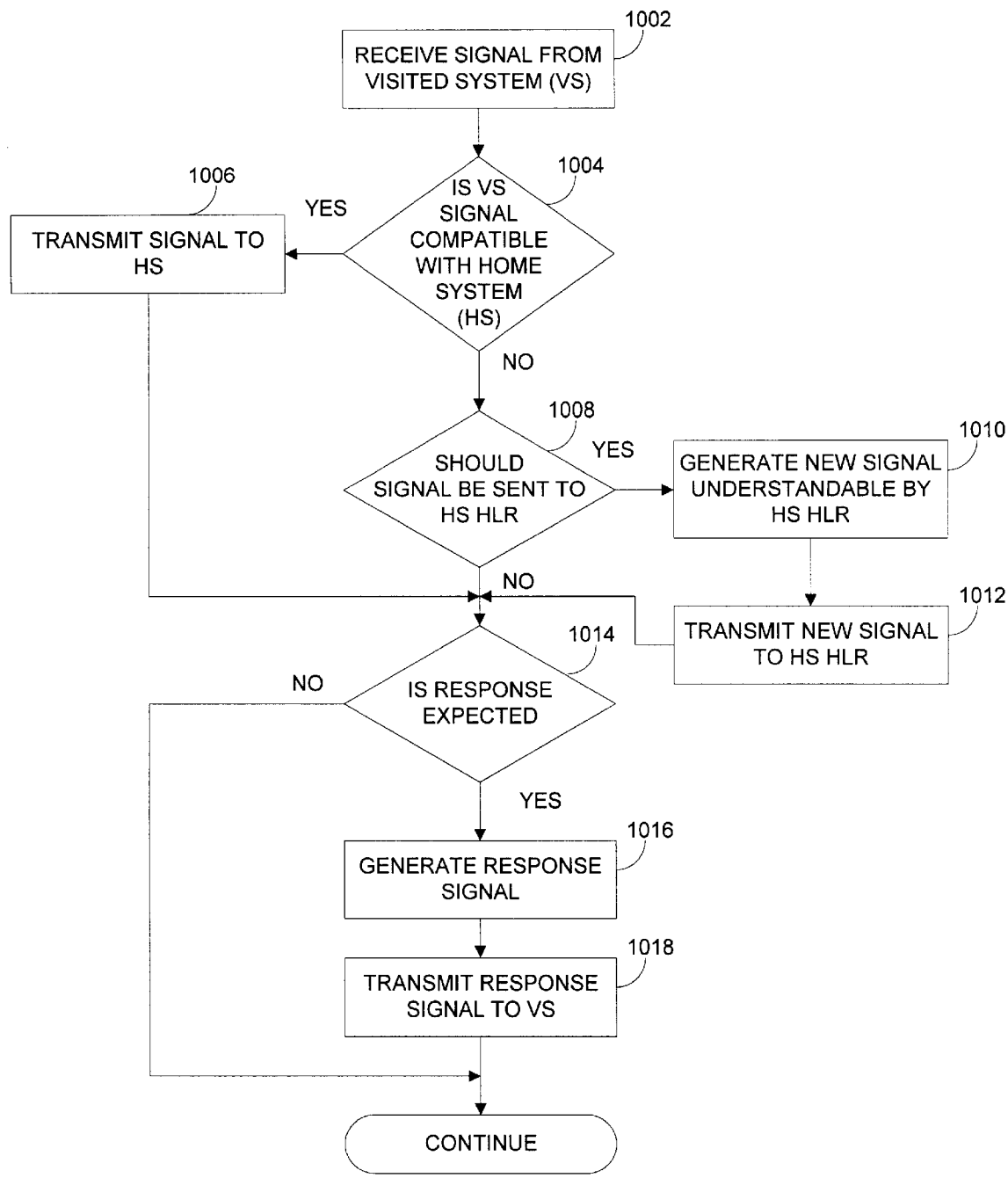
FIG. 10a is a flowchart illustrating the process of the signaling gateway when receiving a signal from a visited system according to the preferred embodiment of the present invention.
Figure 10B:
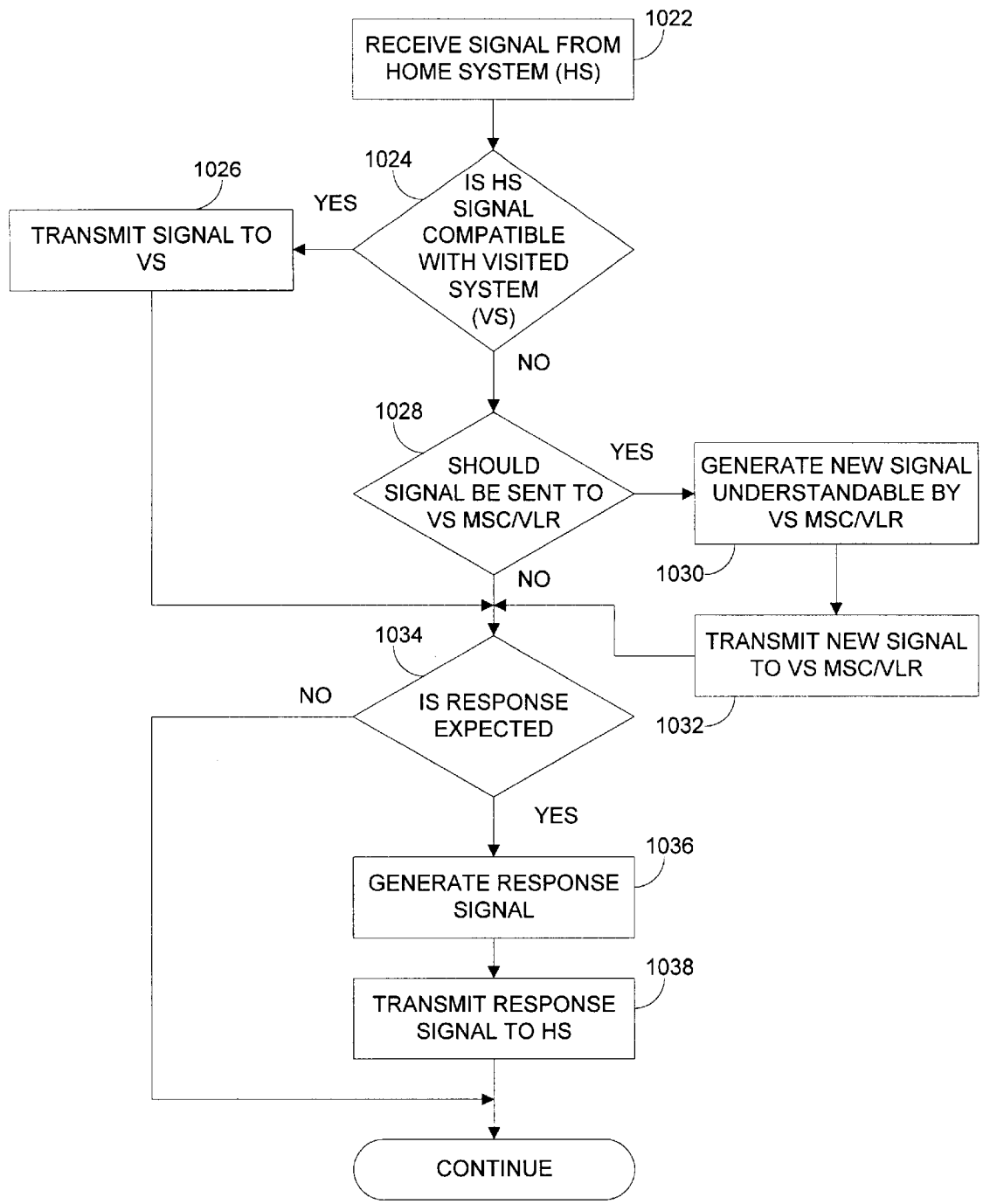
FIG. 10b is a flowchart illustrating the process of the signaling gateway when receiving a signal from a home system according to the preferred embodiment of the present invention.

FIGS. 10A–B are flow charts illustrating an authentication process for a centralized SAC-SAMS topography according to the preferred embodiment of the present invention. A more detailed description of the authentication process is set forth in U.S. patent application Ser. No. 08/672,662, filed by Michael Gallagher et al. on Jun. 28, 1996, entitled "A Signaling Gateway System and Method", that was incorporated by reference above.

Another feature of the present invention is that if an MS 102 roams outside of the home system, e.g., if the MS 102 registers with an MSC/VLR in a visited system that supports features not supported by the MS home system such as authentication, the present invention enables the MS 102 to utilize these additional features. FIG. 3 is an illustration of an example of a cellular network including a signaling gateway according to the preferred embodiment of the present invention, where features supported by a visited system are not supported by a home system. An example of two signaling protocols that support different features is the IS-41B and IS-41C signaling protocols. The IS-41C signaling protocol supports mobile station authentication in addition to other features not supported by the IS-41B signaling protocol such as voice privacy, i.e., air interface channel encryption, subscriber PIN access and subscriber PIN intercept protection, and flexible alerting, e.g., calling one number results in calls to multiple locations. With respect to FIG. 3, an MS 102 having a home system HLR 310B communicates with BS 312A and MSC/VLR 302A in the visited system. The visited system can include one or more additional BS 312B and MSC/VLR 302B. The MSC/VLRs 302 in the visited system each support the IS-41C signaling protocol while the HLR 310B of the home system only supports the IS-41B signaling protocol and not the IS-41C signaling protocol. The HLR 310B in the home system and the MSC/VLRs 302 in the visited systems communicate via an SS7 signaling network 108, described above. A signaling gateway/SAC system 303 is coupled to the SS7 signaling network 108 as illustrated in FIG. 3. The signaling gateway/SAC system 303 includes a gateway/SAC unit 306, a gateway HLR 304, and a gateway VLR 308. The signaling gateway is described in greater detail below.

Figure 9:
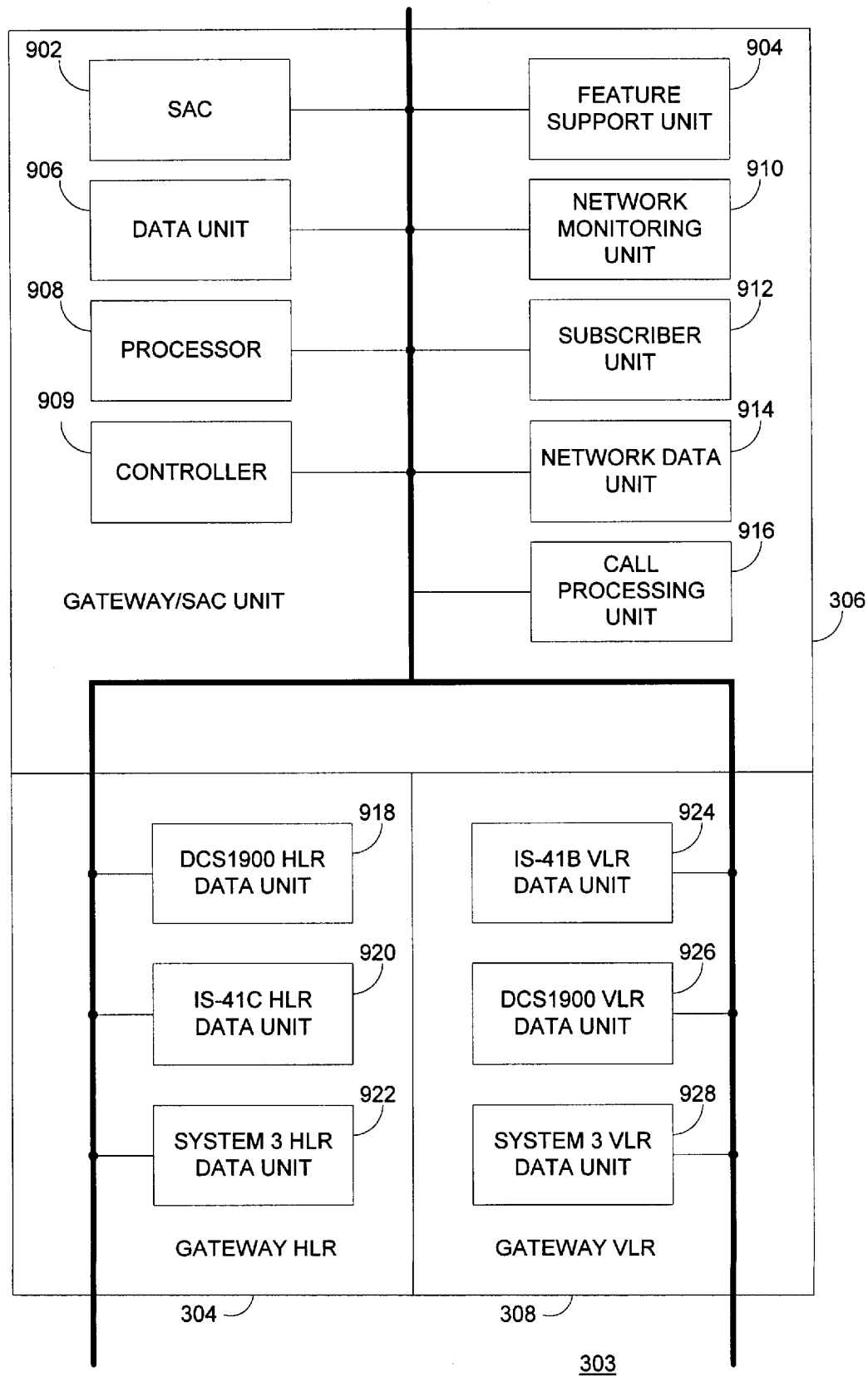
FIG. 9 is a more detailed illustration of the signaling gateway/SAC system according to the preferred embodiment of the present invention.

FIG. 9 is a more detailed illustration of the signaling gateway/SAC system 303 of the present invention which permits a first mobile station to utilize features supported by the visited system but not supported by the home system, e.g., an authentication feature. The gateway/SAC unit 306 includes a SAC 902, a feature support unit 904, a data unit 906, a processor 908, a controller 909, a network monitoring unit 910, a subscriber unit 912, a network data unit 914, and a call processing unit 916. The gateway HLR 304 can include one or more of a DCS1900 HLR data unit 918, an IS-41C HLR data unit 920, and a System 3 HLR data unit 922, for example a IS-41B HLR data unit. In alternate embodiments, the gateway HLR 304 can have more than three HLR data units. In the example illustrated in FIG. 3, the gateway HLR 304 is a HLR from the perspective of the visited system MSC/VLR 302. It is a HLR because the gateway HLR 304 performs the functions of a HLR from the perspective of the visited system MSC/VLR 302. For example, the visited system MSC/VLR 302A transmits signals to the gateway HLR 304 and receives signal from the gateway HLR 304 as if the gateway HLR were the HLR in the home system, e.g.,. HLR 310B. The gateway VLR 308 can include one or more of an IS-41B VLR data unit 924, a DCS1900 VLR data unit 926, and a system 3 VLR data unit 928, for example, an IS-41C VLR data unit 928, In alternate embodiments the gateway VLR 308 can have more than three VLR data units. In the example illustrated in FIG. 3, the gateway VLR 308 is a VLR from the perspective of the home system HLR 310B. It is a VLR because the gateway VLR 308 performs the functions of a VLR from the perspective of the home system HLR 310B. For example, the home system HLR 310B transmits signals to the gateway VLR 308 and receives signals from the gateway VLR 308 as if the gateway VLR were the VLR in the MSC/VLR 302A of the visited system.

In the preferred embodiment, the SAC 902, feature support unit 904, the data unit 906, the controller 909, the network monitoring unit 910, the subscriber unit 912, the network data unit 914, and the call processing unit 916 are located in a storage device, e.g., a conventional non-volatile random access memory (RAM) module that when operated upon by the processor 908 operate in a non-conventional manner, e.g., they can be a computer readable medium having a computer program stored therein wherein the process performed by the computer program is as described herein. The data unit 906 receives and stores signals from the gateway HLR 304 and the gateway VLR 308. The network monitoring unit 910 monitors the signals transmitted through the signaling gateway/SAC system 303 and generates performance statistics, e.g., the number of messages. The controller 909 controls the operation of the signaling gateway/SAC system 303 including identifying and controlling data bus access and communicating with the elements in the gateway/SAC unit 306, the gateway HLR 304, and the gateway VLR 308 to control the timing and sequence of the procedures performed by signaling gateway/SAC system 303. The controller 909 also controls the operation of the SAC 902 and the feature support unit 904.

The subscriber unit 912 performs an interfacing function between the protocol of the visited system and the protocol of the home system. A more detailed description of the functions performed by the subscriber unit is set forth below. The network data unit 914 stores network information, for example the address of the signaling gateway/SAC system 303, the address of the gateway HLR 304, the address of the gateway VLR 308, and the address of the SAMS 204. The call processing unit 916 performs the routing functions for the signaling gateway, for example the call processing unit 916 converts call routing requests from the home system into call routing requests of the visited system and the conversion of response signals from the visited system to the home system.

The gateway HLR 304 can include multiple HLR data units in order to provide HLR services to a visited system supporting one of a variety of signaling protocols. For example, the DCS1900 HLR data unit 918 performs HLR functions for a visited system that supports the DCS1900 signaling protocol. The IS-41C HLR data unit 920 performs HLR functions for a visited system that supports the IS-41C signaling protocol. The system 3 HLR data unit 922 performs HLR functions for a visited system that supports a different signaling protocol, e.g., the IS-41B signaling protocol. Similarly, the gateway VLR 308 can include multiple VLR data units in order to provide VLR services to home systems supporting one of a variety of signaling protocols. For example, the DCS1900 VLR data unit 926 performs VLR functions for a home system that supports the DCS1900 signaling protocol. The IS-41B VLR data unit 924 performs VLR functions for a home system that supports the IS-41B signaling protocol. The system 3 VLR data unit 928 performs VLR functions for a home system that supports a different signaling protocol, e.g., the IS-41C signaling protocol. The operation of the gateway HLR 304 and the gateway VLR 308 are described in greater detail below. In alternate embodiments the signaling gateway/SAC system 303 performs similar functions however the unit that performs each function differs. That is, the functions performed by the gateway HLR 304, the gateway/SAC unit 306, and the gateway VLR 308 may be modified without departing from the spirit and scope of the present invention.

The SAC 902 communicates with the SAMS 204 and together they perform the MS authentication, as described above with respect to the local SAC topography of FIG. 2. The home SAMS 204 includes a mobile identification number (MIN), an electronic serial number (ESN) and an authentication key (A-key) that are unique to each MS 102, as described above. The SAC 902 can implement a conventional authentication procedure, for example, the authentication procedure in the IS-41C protocol that was incorporated by reference in its entirety above. However, in the preferred embodiment the SAMS 204 generates the SSD2 signal and transmits this signal to the SAC 902 in response to an SSD request signal from the SAC using the procedure described above, for example. Therefore, the gateway/SAC system 303, which is centralized and can be connected to many SAMS 204, does not have access to the sensitive authentication information, e.g., the A-key. The present invention operates using the technique described below with respect to FIG. 10a and FIG. 10b. In order for the MS 102 to utilize a feature in the IS-41C signaling protocol that is not available in the IS-41B protocol supported by the home system, the signaling gateway/SAC system 303 authorizes the use of the functions based upon service information received from the HLR 310B. Specifically, the SAC 902 performs the authentication functions normally performed by an HLR/AC of the home system, and the feature support unit 904 performs additional functions normally performed by the HLR/AC of the home system. With respect to FIG. 10a, the SAC 902 generates the authentication commands and responses during step 1016, i.e., it generates a response signal. Similarly, the feature support unit 904 generates the additional feature commands and responses during step 1016. Some examples of the operation of the SAC 902 are described below.

FIG. 10a is a flowchart illustrating the process of the signaling gateway when receiving a signal from a visited system according to the preferred embodiment of the present invention. FIG. 10a will be described with reference to the communication system illustrated in FIG. 3 and the signaling gateway system 303 described in FIG. 9. In this example the home system of the MS 102 includes the IS-41B HLR 310B. The MS 102 is out of range of the home system and is in range of the IS-41C BS 312A that supports the AMPS IS-41C protocol. However, since the IS-41B protocol does not support authentication, for example, conventional mobile communication systems are not capable of having the MS 102 utilize the authentication feature supported by the visited system. As described above, in high risk areas, e.g., in large cities, cellular phone fraud occurs more frequently when no authentication procedure is utilized. As indicated above, the signaling gateway/SAC system 303 of the present invention solves this problem. The IS-41C HLR data unit 920 in the gateway HLR 304 receives 1002 a signal from the MSC/VLR 302A of the visited system (IS-41C system). The IS-41C HLR data unit 920 performs the functions of a conventional HLR in the home system of the MS 102. For example, the IS-41C HLR data unit 920 manages the communication with the MSC/VLR 302A, and considers the gateway/SAC unit 306 as a logical database and a source of various service requests, e.g., for OA&M and call routing. The IS-41C HLR data unit 920 requests information from the data unit 906 in the gateway/SAC unit 306. Thereafter, the controller 909 gives program control to the subscriber unit 912 which determines 1004 if the gateway/SAC unit 306 has the requested information, if the signal received from the visited system is compatible with the home system, and if the MS 102 is a subscriber to the gateway service. If so, the subscriber unit 912 sends an appropriate signal to the IS-41B VLR data unit 924. The IS-41B VLR data unit 924 then transmits 1006 the signal to the home system HLR 310B and the process continues with step 1014, which is described below.

If the signal is not compatible with the home system, for example, if the MSC/VLR 302A transmits an authentication request signal, the subscriber unit 912 determines 1008 if a signal is to be transmitted to the home system This determination is based upon the type of signal received from the visiting system. Some considerations in making this determination include whether information from the home system HLR 310B is necessary to respond to the signal received from the visited system, and whether the received signal includes information that should be sent to the home system. If the subscriber unit 912 determines 1008 that a signal should be sent to the home system HLR 310B, the subscriber sends an appropriate signal to the gateway VLR 308. An appropriate signal is a signal that causes the gateway VLR 308 to generate a IS-41B signal that will, for example, request the desired information. The gateway VLR 308 generates 1010 this signal and transmits 1012 the new signal to the home system HLR 310B.

If the subscriber unit 912 determines that the visited system is expecting a response signal based upon the protocol utilized by the visited system, e.g., the IS-41C protocol, the subscriber unit 912 sends an appropriate signal to the gateway VLR 308 which generates 1016 a response signal and transmits 1018 the response signal to MS 102 via the MSC/VLR 302A and the BS 104A of the visited system.

If the subscriber unit 912 determines that the signal is an authentication request signal, the subscriber unit 912 transmits the signal to the SAC 902. In conjunction with the appropriate SAMS 204, the SAC 902 performs the authentication procedure described above with reference to the SAMS 204 and the SAC 206.

In an alternate embodiment, the gateway/SAC system 303 can process all authentication requests or other specified feature requests, even if the home system supports authentication or the specified feature request. The centralized location of the gateway/SAC system 303 provides an efficient solution since system components, e.g., BS's, HLR's, and MSC/VLR's, do not need to be modified when authentication protocols are modified. Instead the gateway/SAC system 303 transparently handles the functions, e.g., authentication, and updates can be implemented by modifying only the gateway/SAC system 303. In addition, the centralized gateway/SAC system 303 is more secure than conventional systems since the SAC 902 does not have access to sensitive authentication information, e.g., the A-key, as described above.

FIG. 10b is a flowchart illustrating the process of the signaling gateway when receiving a signal from a home system according to the preferred embodiment of the present invention. FIG. 10b will be described with reference to the communication system illustrated in FIG. 3 and the signaling gateway/SAC system 303 described in FIG. 9. FIG. 10a illustrates the situation when the visited system transmits a signal to the signaling gateway. FIG. 10b illustrates a signal transmission in the opposite direction. That is, the HLR 310B of the home system transmits a signal to the signaling gateway/SAC system 303. The IS-41B VLR data unit 924 in the gateway VLR 308 receives 1022 a signal from the HLR 310B of the home system (IS-41B system). The IS-41B VLR data unit 924 transmits the signal to the data unit 906 in the gateway/SAC unit 306. The IS-41B VLR data unit 924 performs the functions of conventional VLRS. For example, the IS-41B VLR data unit 924 manages the communication with the home system HLR 310B, it also considers the gateway/SAC unit 306 as a logical database, a logical MSC, and a source of various service requests, e.g., for OA&M and feature requests. The controller 909 gives program control to the subscriber unit 912 which determines 1024 if the signal received from the home system is compatible with the visited system. If the received signal is compatible with the visited system the subscriber unit sends an appropriate signal to the IS-41C HLR data unit 920. The IS-41C HLR data unit 920 then transmits 1026 the signal to the visited system and the process continues with step 1034, described below.

If the signal is not compatible with the visited system, the subscriber unit 912 determines 1028 if a signal is to be transmitted to the visited system. This determination is based upon the type of signal received from the home system, and whether the received signal includes information that should be sent to the visited system. If the subscriber unit 912 determines 1028 that a signal should be sent to the MSC/VLR 302A of the visited system, the subscriber unit 912 determines the appropriate type of IS-41C signal to generate, and sends an appropriate signal to the IS-41C HLR data unit 920 which generates 1030 this signal and transmits 1032 the signal to the MSC/VLR 302A of the visited system.

If the subscriber unit 912 determines 1034 that the HLR 310B of the home system is expecting a response signal based upon the protocol utilized by the home system, e.g., the IS-41B protocol, the subscriber unit 912 sends an appropriate signal to the IS-41B VLR data unit 924. The IS-41B VLR data unit 924 then generates 1036 and transmits 1038 the response signal to HLR 310B of the home system via the IS-41B VLR data unit 924. It will be apparent that the present invention operates between systems using different protocols in addition to the IS-41B protocol and the IS-41C protocol. The conversion requirements between two protocols will be apparent to persons skilled in the relevant art.

FIG. 11 is an example of a registration signaling process including authentication according to one embodiment of the present invention In FIG. 11 an MSC/VLR 302A and the SAC 902 in the signaling gateway/SAC system 303 perform an authentication procedure. At time A the MSC/VLR 302A in the IS-41C system transmits an authentication request signal (AUTHREQ) to the gateway/SAC system 303 which forwards the request to the SAC 902. The authentication request includes an authentication value based upon a global authentication challenge (GC). The SAC 902 stores an SSD2 value in the MS identification data unit 420. The operation of the SAC 902 is similar to the operation of the SAC 206 described above. The SAC 902 compares the GC value with the value determined based upon the authentication algorithm and the MS information, e.g., the MIN, ESN, and the SSD2 signals. If the GC matches the value determined by the SAC 902, the SAC can identify the MS as authentic or it can challenge the MS to generate another authentication value. At time B the SAC 902 issues a response to the authentication signal (authreq[UC]) requesting that the MS generate another authentication value. This response signal includes a "unique challenge" having a random value and the expected response value based upon the effect of the authentication procedure on the random value. The random value is transmitted to the MS 102 which determines a new authentication value using the process described above, for example. The SAC 902 requests an Update/unique challenge request in order to update the value of the SSD in the MS 102 which can be used whenever the SSD is to be updated. The MSC/VLR 302A compares the new authentication value with the expected response value. The MSC/VLR 302A transmits an authentication report command (ASREPORT[UCRPT]) to the SAC 902 at time C indicating whether the MS 102 has passed or failed the authentication procedure. The SAC 902 acknowledges the message at time D using the authentication report response (asreport). If the MS 102 is authenticated, the MSC/VLR 302A attempts to register the MS 102 at time E by transmitting a registration notification signal (REGNOT) to the signaling gateway/SAC system 303. If the MS 102 satisfied the authentication process, the signaling gateway/SAC system 302 transmits a registration notification command (REGNOT) to the HLR of the home system at time F. If the MS 102 does not satisfy the authentication process the SAC 902 prevents the MS 102 from registering using the technique set forth in a conventional authentication protocol. After receiving the registration notification command (REGNOT), the home system HLR 310B generates and transmits a registration notification response signal (regnot) to the signaling gateway/SAC system 303. The signaling gateway/SAC system 303 then generates and transmits a registration notification response signal (regnot) to the MSC/VLR 302A. This completes the authentication and registration process of an MS 102 transmitting through the MSC/VLR 302A. Accordingly, even though the home system HLR 310B for the MS 102 was not capable of authenticating the MS 102 using the IS-41C authentication procedure, the present invention enables the MS 102 to utilize this feature while visiting a system supporting authentication. In addition, the SAC 902 performs the authentication procedure without having access to sensitive authentication information, e.g., the A-key.

While the present invention has been particularly shown and described with reference to a preferred embodiment, and several alternate embodiments, it will be understood by persons skilled in the relevant art that various changes in form and details can be made therein without departing from the spirit and scope of the invention.

What is claimed is:

1. A method for authenticating a first mobile station comprising the steps of:

receiving an authentication request in a secure authentication center (SAC), said authentication request including a first authentication signal generated by the first mobile station; transmitting a request signal from said SAC to a secure authentication-key management system (SAMS), said request signal identifying the first mobile station;

generating a response signal in the SAMS, said response signal generated using authentication information signals not available to the SAC;

transmitting said response signal from said SAMS to said SAC;

generating a second authentication signal using said response signal and additional non-sensitive authentication information signals;

comparing said first authentication signal and said second authentication signal;

generating a authentication result signal in response to said comparing step, said authentication result identifying whether the mobile station has been successfully authenticated.

2. A system for generating a shared data signal for use in authenticating a first mobile station comprising:

a first device, having a memory module, said memory module having a first secret data signal stored therein, said first device receiving a data request signal representing a request for the shared data signal to be used for authenticating the first mobile station, generating the shared data signal using said first secret data in response to said data request signal, transmitting said shared data signal, wherein said first secret data signal is stored only in said first device and the first mobile station.

3. The system of claim 2, further comprising:

an authentication unit, disposed to communicate with the first mobile station, for authenticating said first mobile station, said authentication unit not having access to said first secret data signal.

4. The system of claim 3, wherein said data request signal includes a first identification signal that identifies the first mobile station.

5. The system of claim 4, wherein said first device uses an encryption algorithm to generate said shared data signal.

6. The system of claim 5, wherein said encryption algorithm utilizes said first identification signal, said first secret data signal, and said first number signal to generate said shared data signal wherein said first number signal is signal representing one of a random number and a pseudo-random number.

7. The system of claim 6, wherein said first device generates said first number signal.

8. The system of claim 6, wherein said authentication unit generates said first number signal.

9. The system of claim 3, wherein said authentication unit receives said shared data signal from said first device and a first authentication signal representing authentication information for said first mobile station;

wherein said authentication unit generates a second authentication signal using said shared data signal and compares said first and second authentication signal to authenticate said first mobile system.

10. The system of claim 9, wherein said authentication unit receives a first signal representing one of a random number and a pseudo random number that is used to generate said first authentication signal wherein said authentication unit utilizes said first signal to generate said second authentication signal.

11. The system of claim 2, wherein said data request signal includes a first identification signal that identifies the first mobile station.

12. The system of claim 11, wherein said first device uses an encryption algorithm to generate said shared data signal.

13. The system of claim 12, wherein said encryption algorithm utilizes said first identification signal, said first secret data signal, and said first number signal to generate said shared data signal wherein said first number signal represents one of a random number and a pseudo-random number.

14. The system of claim 13, wherein said first device generates said first number signal.

15. The system of claim 2, wherein said first device uses an encryption algorithm to generate said shared data signal.

16. A system for authenticating a first mobile station comprising:

an authentication unit, disposed to communicate with the first mobile station, for authenticating said first mobile station; and a first device, having a memory module, said memory module having a first secret data signal stored therein, said first device receiving a data request signal representing a request for a shared data signal to be used for authenticating the first mobile station, generating a shared data signal using said first secret data in response to said data request signal, transmitting said shared data signal, wherein said first secret data signal is not available to said authentication unit.

17. The system of claim 16, wherein said authentication unit receives said shared data signal from said first device and a first authentication signal representing authentication information for said first mobile station;

wherein said authentication unit generates a second authentication signal using said shared data signal and compares said first and second authentication signal to authenticate said first mobile system.

18. The system of claim 17, wherein said authentication unit receives a first signal representing one of a random number and a pseudo random number that is used to generate said first authentication signal wherein said authentication unit utilizes said first signal to generate said second authentication signal.

19. The system of claim 18, wherein said data request signal includes a first identification signal that identifies the first mobile station.

20. The system of claim 19, wherein said first device uses an encryption algorithm to generate said shared data signal.

21. The system of claim 20, wherein said encryption algorithm utilizes said first identification signal, said first secret data signal, and said first number signal to generate said shared data signal wherein said first number signal is signal representing one of a random number and a pseudo-random number.

22. The system of claim 21, wherein said first device generates said first number signal.

23. The system of claim 21, wherein said authentication unit generates said first number signal.

24. The system of claim 16, wherein said data request signal includes a first identification signal that identifies the first mobile station.

25. The system of claim 24, wherein said first device uses an encryption algorithm to generate said shared data signal.

26. The system of claim 25, wherein said encryption algorithm utilizes said first identification signal, said first secret data signal, and said first number signal to generate said shared data signal wherein said first number signal is signal representing one of a random number and a pseudo-random number.

27. The system of claim 26, wherein said first device generates said first number signal.

28. The system of claim 26, wherein said authentication unit generates said first number signal.

29. A method for generating a shared data signal in a first device having a memory module having a first secret data signal stored therein, for authenticating a first mobile station comprising the steps of:

receiving a data request signal representing a request for a shared data signal to be used for authenticating the first mobile station;

generating a shared data signal using a first secret data in response to said data request signal; and transmitting said shared data signal, wherein said first secret data signal is stored only in said first device and the first mobile station.

30. The method of claim 29 further comprising the step of:

authenticating said first mobile station by an authentication unit not having access to said first secret data signal.

31. The method of claim 30, wherein said data request signal includes a first identification signal that identifies the first mobile station.

32. The method of claim 31, wherein said step of generating a shared data signal includes the step of using an encryption algorithm to generate said shared data signal.

33. The method of claim 32, wherein said encryption algorithm utilizes said first identification signal, said first secret data signal, and said first number signal to generate said shared data signal wherein said first number signal is signal representing one of a random number and a pseudo-random number.

34. The method of claim 30, further comprising the steps of:

receiving said shared data signal from said first device and a first authentication signal representing authentication information for said first mobile station at said authentication unit;

generating a second authentication signal using said shared data signal; and comparing said first and second authentication signal to authenticate said first mobile system.

35. The method of claim 34, further comprising the steps of:

receiving a first signal representing one of a random number and a pseudo random number that is used to generate said first authentication signal; and utilizing said first signal to generate said second authentication signal.

* * * * *